(12) United States Patent
Lueker, Jr.

(10) Patent No.: US 7,874,564 B2
(45) Date of Patent: Jan. 25, 2011

(54) TORQUE STEER REDUCTION SYSTEM

(75) Inventor: David Charles Lueker, Jr., Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 449 days.

(21) Appl. No.: 12/110,638

(22) Filed: Apr. 28, 2008

(65) Prior Publication Data

US 2009/0266658 A1  Oct. 29, 2009

(51) Int. Cl.
*B62D 7/22* (2006.01)
*B62D 5/06* (2006.01)

(52) U.S. Cl. .................. 280/89.12; 180/421; 280/5.52; 280/89.1; 280/89.13; 280/90

(58) Field of Classification Search .................. 180/421, 180/422, 423; 280/5.52, 5.522, 89, 89.1, 280/89.11, 89.12, 89.13, 90
See application file for complete search history.

(56) References Cited

U.S. PATENT DOCUMENTS

| | | | |
|---|---|---|---|
| 3,420,542 A * | 1/1969 | Leonard, Jr. ............... 280/89.1 |
| 3,887,027 A | 6/1975 | Allison | |
| 4,279,428 A | 7/1981 | Onodera | |
| 4,406,473 A | 9/1983 | Sexton | |
| 4,410,193 A | 10/1983 | Howard | |
| 4,418,931 A * | 12/1983 | Howard ................... 280/89.11 |
| 4,558,878 A | 12/1985 | Motrenec | |
| 4,588,198 A * | 5/1986 | Kanazawa et al. ............ 280/90 |
| 4,634,135 A * | 1/1987 | Nakata et al. ................. 280/90 |
| 4,669,567 A * | 6/1987 | Nakamura et al. .......... 180/415 |
| 4,822,012 A | 4/1989 | Sketo | |
| 4,925,165 A | 5/1990 | Sketo | |
| 5,527,053 A | 6/1996 | Howard | |
| 5,536,028 A | 7/1996 | Howard | |
| 5,845,222 A * | 12/1998 | Yamamoto et al. ............ 701/41 |
| 6,086,075 A * | 7/2000 | O'Bryan et al. .......... 280/89.12 |
| 6,126,154 A | 10/2000 | Shepherd | |
| 6,267,395 B1 | 7/2001 | Howard | |
| 6,273,208 B1 * | 8/2001 | Sand .......................... 180/299 |
| 6,418,856 B2 | 7/2002 | Hossfield et al. | |
| 6,520,519 B2 * | 2/2003 | Howard ................... 280/89.13 |
| 6,520,520 B2 | 2/2003 | Howard | |
| 6,530,585 B1 | 3/2003 | Howard | |
| 6,698,777 B1 | 3/2004 | Shepherd | |
| 6,817,620 B1 | 11/2004 | Howard | |
| 7,070,019 B2 | 7/2006 | Takamoto et al. | |
| 7,207,579 B1 | 4/2007 | Howard | |
| 7,207,580 B2 | 4/2007 | Howard | |
| 7,286,919 B2 | 10/2007 | Nordgren et al. | |
| 7,658,260 B2 * | 2/2010 | Togashi et al. .............. 180/338 |
| 7,743,874 B2 * | 6/2010 | Yasui et al. .................. 180/444 |
| 2002/0138186 A1 | 9/2002 | Kim | |
| 2005/0113998 A1 | 5/2005 | Kim | |
| 2010/0211278 A1 * | 8/2010 | Craig et al. .................... 701/70 |

* cited by examiner

*Primary Examiner*—Toan C To
*Assistant Examiner*—Laura Freedman
(74) *Attorney, Agent, or Firm*—Plumsea Law Group, LLC

(57) ABSTRACT

A torque steer reduction system is disclosed. The system includes a damper. The damping effect of the damper is variable. Furthermore, the damping effect may be adjusted through a damping coefficient. High damping coefficients may correspond to stronger damping effects. During periods associated with a greater influence of torque steer, the damper may be configured with a high damping coefficient to counteract torque steer.

20 Claims, 4 Drawing Sheets

TORQUE STEER REDUCTION SYSTEM

BACKGROUND OF THE INVENTION

1. Field of the Invention

The present invention relates to motor vehicles and in particular to a torque steer reduction system for a motor vehicle.

2. Description of Related Art

Kim (U.S. patent application publication number 2005/0113998) is directed to an electronically controlled suspension apparatus and damping force control method. Kim teaches an apparatus and damping control method that hardens damping force characteristics of a damper when a stroke of the damper (or relative displacement of a vehicle body with respect to a wheel axle) is in a critical stroke range. This prevents full extension or full bumping from occurring in the damper to prevent damage and increase riding comfort.

Kim teaches a damper installed between a vehicle body and a wheel axle, an actuating unit for controlling damping force characteristics of the damper and a stroke detecting unit for detecting a stroke of the damper. Kim also teaches sensing various parameters including vehicle speed and throttle position. Kim teaches computing a control command value for the damper according to various control values. Following this, Kim teaches determining the relative displacement between the vehicle body and the wheel axle, as well as the relative velocity between the two, in order to compute an adjusted control command value. By controlling the damper according to the adjusted control value, damage to the damper can be prevented during periods when the damper is in a critical stroke.

Kim (U.S. patent application publication number 2002/0138186) is directed to an adaptive electronic control suspension system. Kim teaches this system and a method for controlling the system to improve driving performance and steering stability by controlling the damping force of a variable damper according to vehicle speed, steering angle, opening amount of throttle value, up/down acceleration, brake operation and axle acceleration.

Kim teaches the use of a throttle position to determine the adjustment of dampers in the motor vehicle. Kim teaches sensing a vehicle speed and an opening amount of the throttle valve from a vehicle speed sensor and a throttle position sensor, respectively. Following this, a squirt variable is computed according to the vehicle speed and a differentiated value of the throttle position. The squirt variable value is compared with a predetermined value to determine how control of the dampers should be adjusted.

Nordgren (U.S. Pat. No. 7,286,919) is directed to a method and apparatus for controlling damping of a vehicle suspension. Nordgren teaches this method and apparatus to help reduce control valve noise associated with the damping system. Nordgren teaches a suspension controller that receives inputs from various sensing systems, including throttle position, brake force requests, steering wheel input and operator-selectable damping input. Nordgren also teaches a modal sensing system that monitors a vehicle speed as well as modal velocities of the motor vehicle. Nordgren further teaches dampers that are attached between a lower control arm and a mounting location on the chassis. A common damping rate for controllable suspension dampers is determined based upon vehicle forward velocity and the modal velocities.

SUMMARY OF THE INVENTION

A torque steer reduction system is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to: cars, trucks, vans, minivans, SUV's, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy, for example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a motor vehicle, comprising: a steering system configured to turn at least one wheel of the motor vehicle; a damper including a first end portion attached to a frame portion of the motor vehicle and a second end portion attached to the steering system; and where the damper is configured to exert a damping force on the steering system.

In another aspect, the damper is attached to a tie rod of the steering system.

In another aspect, the damper is attached to a steering arm of the steering system.

In another aspect, the damper is disposed away from a control arm of the motor vehicle.

In another aspect, the damper is oriented in a direction that is generally parallel with a bottom surface of the motor vehicle.

In another aspect, the damping force of the damper is variable.

In another aspect, the damping force of the damper is controlled according to a current throttle position of a throttle valve.

In another aspect, the invention provides a motor vehicle, comprising: a steering system configured to turn at least one wheel of the motor vehicle; a damper capable of exerting varying damping forces on the steering system; the damper including a first end portion attached to a frame portion of the motor vehicle and a second end portion attached to a steering system of the motor vehicle; a throttle valve sensor configured to receive information related to a current throttle position; and where the damper exerts a damping force on the steering system and wherein the strength of the damping force is controlled according to the current throttle position.

In another aspect, the damper is a variable viscosity damper.

In another aspect, the viscosity of the damper is controlled using an electrical current.

In another aspect, the electrical current is increased with increased throttle position.

In another aspect, a damping coefficient of the damper is increased with increased throttle position.

In another aspect, the damper is connected to a drive-by-wire system of the motor vehicle.

In another aspect, the invention provides a method of reducing torque steer in a motor vehicle, comprising the steps of: receiving information related to a current throttle position; determining a damping coefficient for a damper according to the current throttle position; controlling the damper to achieve the damping coefficient; and thereby reducing torque steer in the motor vehicle.

In another aspect, a first end portion of the damper is attached to a frame portion of the motor vehicle.

In another aspect, a second end portion of the damper is attached to a steering system of the motor vehicle.

In another aspect, the second end portion of the damper is attached to a tie rod of the steering system.

In another aspect, the second end portion of the damper is attached to a steering arm of the steering system.

In another aspect, the step of controlling the damper includes a step of sending a current to the damper.

In another aspect, the magnitude of the current is related to the current throttle value.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
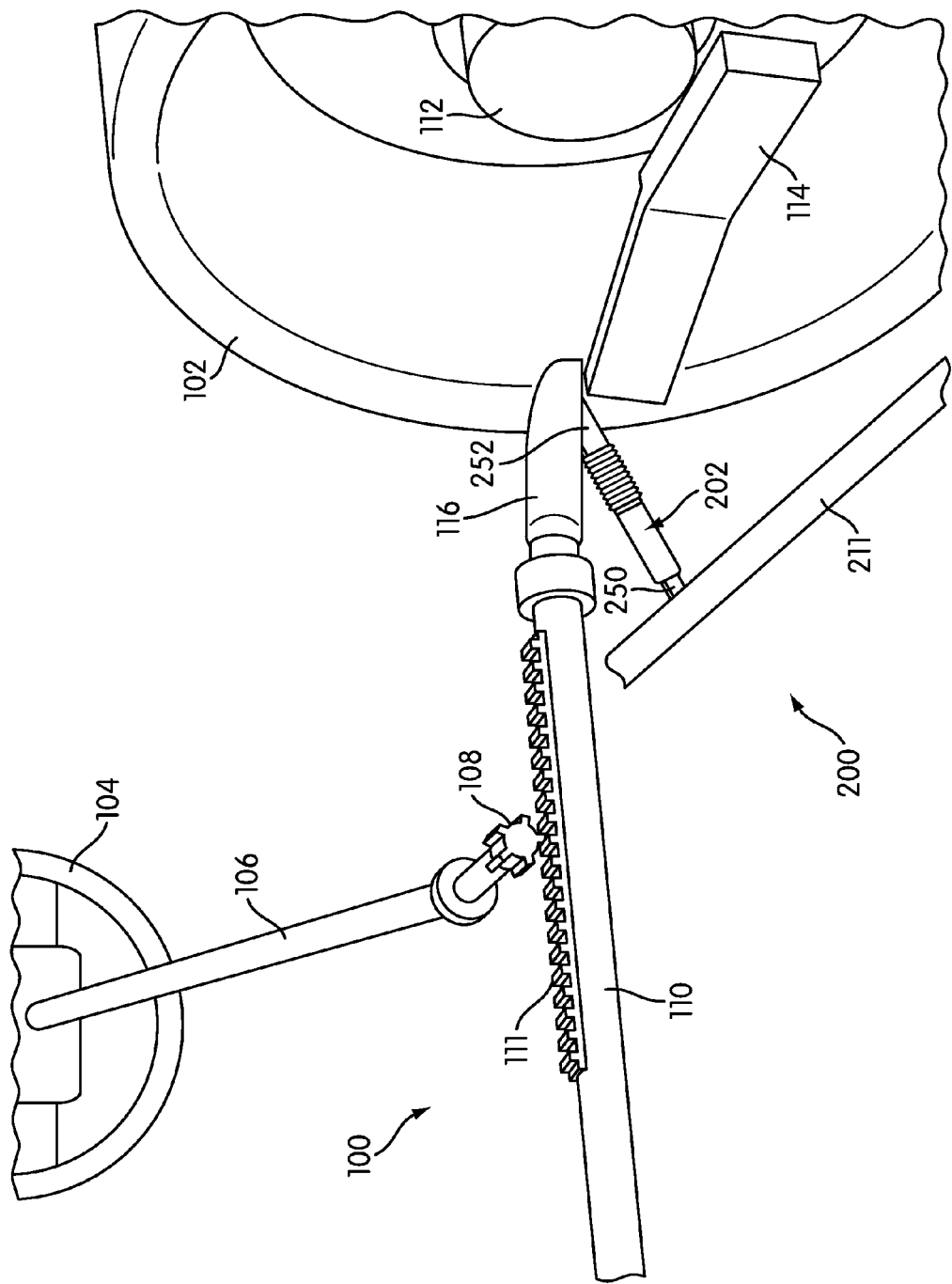
FIG. 1 is an isometric view of a preferred embodiment of a portion of a steering system.

FIG. 1 is an isometric view of a preferred embodiment of a portion of steering system 100. Steering system 100 is preferably associated with a motor vehicle of some kind. Generally, steering system 100 could be associated with any type of motor vehicle, including, but not limited to cars, trucks, vans, minivans, SUV's, motorcycles, scooters, boats, personal watercraft, and aircraft. In this preferred embodiment, steering system 100 is associated with a motor vehicle with front wheel drive.

Steering system 100 may be any type of steering system. In some embodiments, steering system 100 may be a power rack-and-pinion system. In other embodiments, steering system 100 may be a drive-by-wire system. In still other embodiments, steering system 100 may be a recirculating-ball steering system. In this embodiment, steering system 100 is a rack-and-pinion steering system.

Steering system 100 is preferably associated with additional components that may assist in steering a motor vehicle. For clarity, only some components of steering system 100 are shown in this schematic illustration. It should be understood that in other embodiments, additional components may be used with steering system 100.

In this embodiment, steering system 100 is associated with front right wheel 102. In some cases, additional wheels may be associated with steering system 100. For example, a front left wheel of a motor vehicle may be associated with steering system 100. In other cases, some additional wheels may be associated with a separate steering system. In still other cases, some wheels may not be associated with any steering system. For example, in front wheel drive vehicles, rear wheels of the motor vehicle may not be associated with any type of steering system.

Front right wheel 102 preferably includes provisions to receive steering direction from steering system 100. In this embodiment, front right wheel 102 is configured with spindle 112. Furthermore, spindle 112 is associated with steering arm 114. With this arrangement, steering system 100 may steer front right wheel 102 by applying forces to steering arm 114 of spindle 112.

In this embodiment, steering system 100 is configured to receive input from a driver through steering wheel 104. Through rotational motion of steering wheel 104, a driver may indicate a direction for a motor vehicle. In some cases, steering system 100 may convert the rotational motion of steering wheel 104 to linear motion to steer front right wheel 102.

Steering wheel 104 may be associated with steering shaft 106. Generally, steering shaft 106 may convey the rotational motion of steering wheel 104 to other components of steering system 100. In this embodiment, steering shaft 106 conveys the rotational motion of steering wheel 104 to pinion gear 108.

Preferably, pinion gear 108 operates with steering rod 110. In particular, pinion gear 108 may be configured to engage with rack 111 of steering rod 110. Generally, rack 111 may be configured in any arrangement to receive pinion gear 108. In some cases, rack 111 may be configured with identical tooth pitch on steering rod 110. In other cases, rack 111 may include a different tooth pitch in different regions of steering rod 110. With the connection to steering shaft 106, pinion gear 108 is configured to move steering rod 110 in a lateral direction as steering wheel 104 turns.

Generally, steering rod 110 may be attached to front right wheel 102 through any manner known in the art. In this embodiment, steering rod 110 may be attached to front right wheel 102 through tie rod 116. In particular, tie rod 116 may connect steering rod 110 to steering arm 114 of spindle 112. With this configuration, steering system 100 may convey steering input from steering wheel 104 to front right wheel 102.

In some cases, a drive train may exert a steering force input on a steering system. Typically, front wheel drive and all wheel drive motor vehicles, particularly during times of acceleration, may experience torque steer. The term "torque steer" as used throughout this detailed description and in the claims, refers to the influence of engine torque on a steering system. Torque steer may be caused by an imbalance in the amount of power transferred to different wheels of a motor vehicle. For example, in a front wheel drive motor vehicle, if there is an imbalance in the amount of power supplied to a front right wheel and a front left wheel, one wheel may tend to veer from an intended direction. In addition, the imbalance of power transferred may create a tugging or pulling sensation on a steering wheel of a motor vehicle.

The influence of torque steer may be related to torque output of an engine. Generally, torque steer increases as engine torque increases. Therefore, problems with torque steer may be magnified at greater or more open throttle positions. In other words, the influence of torque steer may be most evident during acceleration.

Steering system 100 may be associated with torque steer reduction system 200. Preferably, torque steer reduction system 200 includes provisions to reduce torque steer. In this preferred embodiment, torque steer reduction system 200 includes damper 202 to reduce torque steer. Generally, damper 202 may be any type of damper. In some embodiments, damper 202 may be a variable viscosity damper. Damper 202 may be any type of variable viscosity damper known to those skilled in the art, such as, for example, an electro-rheological damper or a magnetorheological damper, for example. In some embodiments, damper 202 may be electrically powered. In this preferred embodiment, damper 202 is a variable viscosity damper that is electrically powered.

Figure 2:
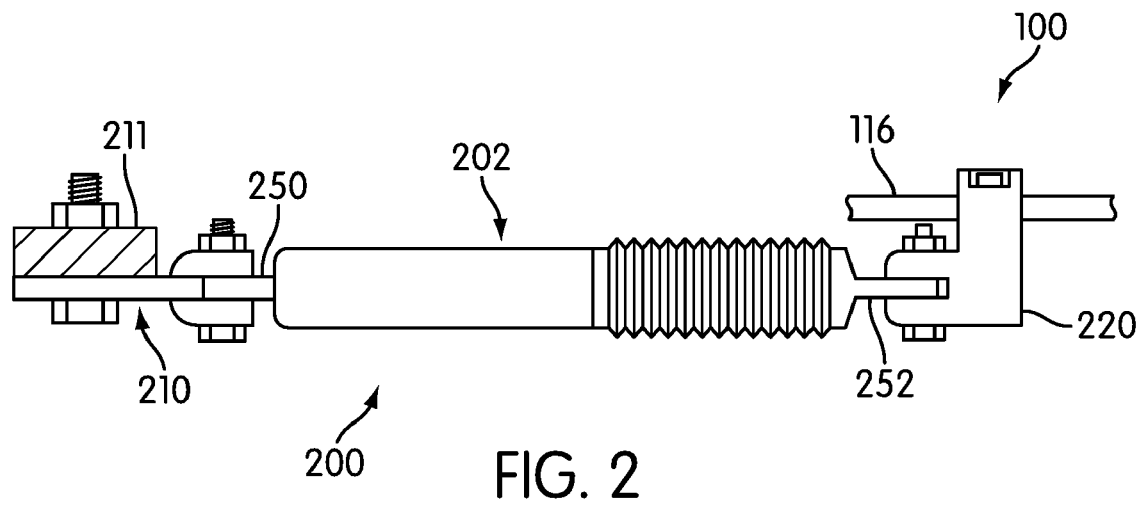
FIG. 2 is an enlarged view of a preferred embodiment of a portion of a torque steer reduction system.

FIG. 2 illustrates an enlarged view of a preferred embodiment of a portion of torque steer reduction system 200. Referring to FIGS. 1 and 2, damper 202 may be mounted to a fixed portion of a frame of a motor vehicle. In the current embodiment, first end portion 250 of damper 202 is mounted to frame portion 211. In particular, frame mount 210 mounts first end portion 250 to frame portion 211. Frame mount 210 may be any type of mounting system capable of mounting damper 202 to a fixed portion of a frame of the motor vehicle. In this manner, first end portion 250 of damper 202 may be secured to frame portion 211.

In addition, torque steer reduction system 200 preferably includes provisions to mount damper 202 to a moving portion of steering system 100. In this preferred embodiment, second end portion 252 of damper 202, disposed opposite of first end portion 250, may be mounted to a moving portion of steering system 100. In some embodiments, second end portion 252 may be mounted to steering arm 114 (see FIG. 1). In this preferred embodiment, second end portion 252 of damper 202 is mounted to tie rod 116. Generally, any type of mounting system that is capable of mounting damper 202 to a moving portion of a steering system may be used. In this embodiment, rod mount 220 is configured to mount second end portion 252 to tie rod 116.

Generally, damper 202 may be oriented in any direction. In some embodiments, damper 202 could be oriented in a generally vertical direction. In other embodiments, damper 202 could be oriented in a generally horizontal direction. In this preferred embodiment, damper 202 is oriented in a generally horizontal direction. The term horizontal direction, as used in this detailed description and in the claims, refers to a direction generally parallel with a bottom surface of the motor vehicle. Additionally, the horizontal direction may be generally parallel with a ground surface disposed beneath the motor vehicle.

With a damper mounted to a fixed portion of a frame of a motor vehicle and a moving portion of a steering system, a torque steer reduction system may be configured to reduce torque steer. This arrangement preferably allows a damper to apply a damping effect on a steering system to counteract torque steer. Preferably, a damping effect on the steering system increases the steering effort required to steer a motor vehicle. In this manner, a torque steer reduction system may reduce torque steer by adjusting the steering effort required by the driver to steer the motor vehicle.

In some embodiments, front right wheel 102 may also be associated with additional components. For example, in some embodiments, front right wheel 102 may be associated with a control arm of a suspension system. In such embodiments, a damper is preferably disposed away from the control arm to prevent interaction between the damper and the suspension system.

In this preferred embodiment, damper 202 is configured to apply a variable damping effect on steering system 100. In particular, damper 202 may apply a damping effect that is associated with a damping coefficient. The term "damping coefficient" as used throughout this detailed description and in the claims, refers to the strength of the damping. Generally, high damping coefficients may be associated with stronger damping. Similarly, low damping coefficients may be associated with weaker damping.

As previously discussed, during times of acceleration, the influence of torque steer may be more evident. Preferably, a torque steer reduction system may be configured with a high damping coefficient during times of acceleration to counteract torque steer. By receiving information related to throttle position, a torque steer reduction system may exert a damping effect associated with a high damping coefficient during times of greater or fully open throttle positions. Similarly, with this arrangement, a torque steer reduction system may be configured with a low damping coefficient during times of low or closed throttle positions.

Figure 3:
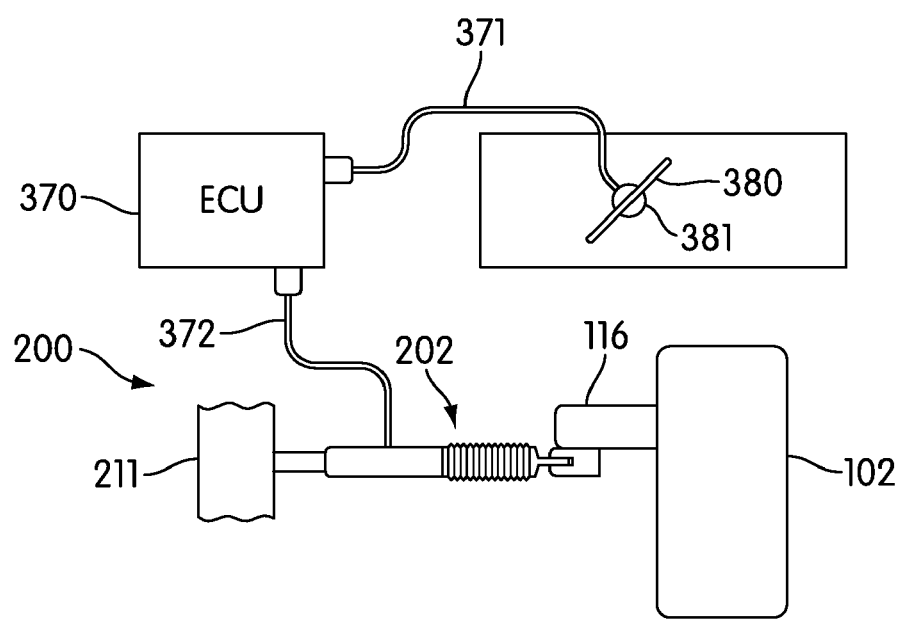
FIG. 3 is a schematic view of a preferred embodiment of a torque steer reduction system.

FIG. 3 illustrates a schematic view of a preferred embodiment of torque steer reduction system 200. Torque steer reduction system 200 preferably includes provisions for communicating with one or more components of a motor vehicle in order to receive information regarding the influence of torque steer on a motor vehicle. In this preferred embodiment, torque steer reduction system 200 receives information on a throttle position that may be related to the influence of torque steer on a motor vehicle.

Torque steer reduction system 200 preferably includes electronic control unit 370, hereby referred to as ECU 370. In some embodiments, ECU 370 may be a computer or similar device associated with a motor vehicle. In some cases, ECU 370 may be configured with a drive-by-wire system. For clarity, only some components associated with ECU 370 are shown in this schematic illustration. Generally, ECU 370 may be configured to communicate with, and/or control, additional components of a motor vehicle.

In some embodiments, ECU 370 may receive information from a throttle valve sensor. In the current embodiment, ECU 370 may communicate with throttle valve sensor 381 via first circuit 371. In particular, ECU 370 may receive information related to the position of throttle valve 380.

Preferably, ECU 370 may be configured to control damper 202. In particular, ECU 370 may communicate information related to the position of throttle valve 380 to damper 202 via second circuit 372. With this arrangement, torque steer reduction system 200 may receive information related to position of throttle valve 380 and adjust damping coefficients in accordance with the current throttle position.

Generally, first circuit 371 and second circuit 372 may be any type of circuits. In some embodiments, first circuit 371 and second circuit 372 may be a wired electrical connection. In other embodiments, first circuit 371 and second circuit 372 may be wireless connections.

Generally, a torque steer reduction system may exert a damping force on a steering system using any manner known in the art. In this preferred embodiment, torque steer reduction system 200 exerts a variable damping force by modifying the viscosity of damper 202. Preferably, the viscosity of damper 202 may be changed by the application of an electrical current associated with a damping coefficient. With this configuration, the viscosity of damper 202 may be altered to achieve different damping coefficients.

Figure 4:
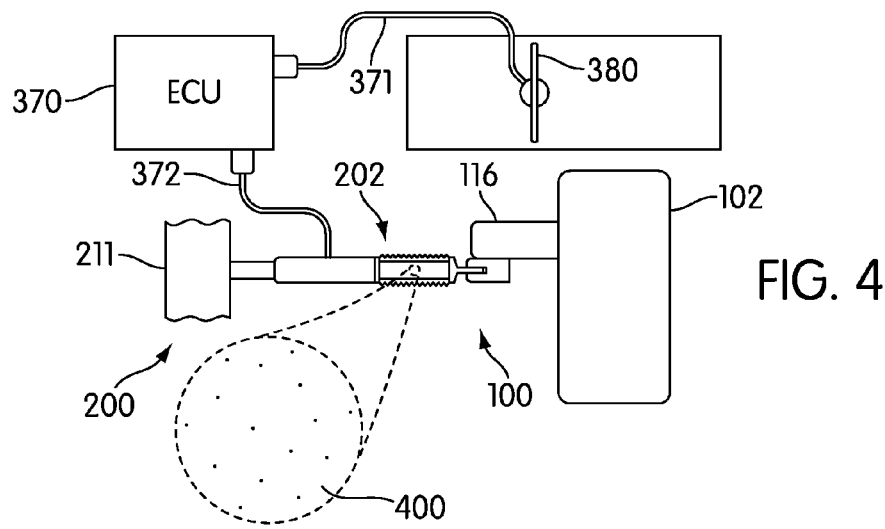
FIG. 4 is a schematic view of an exemplary embodiment of a torque steer reduction system and a throttle valve.
Figure 5:
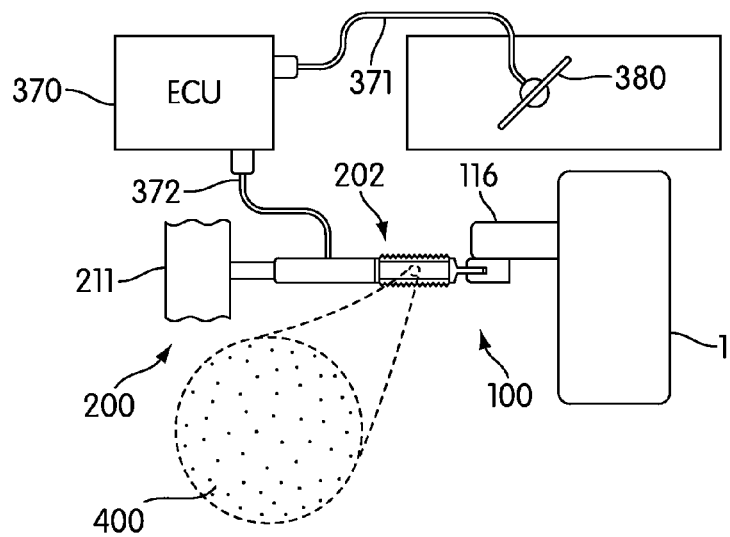
FIG. 5 is a schematic view of an exemplary embodiment of a torque steer reduction system and a throttle valve.
Figure 6:
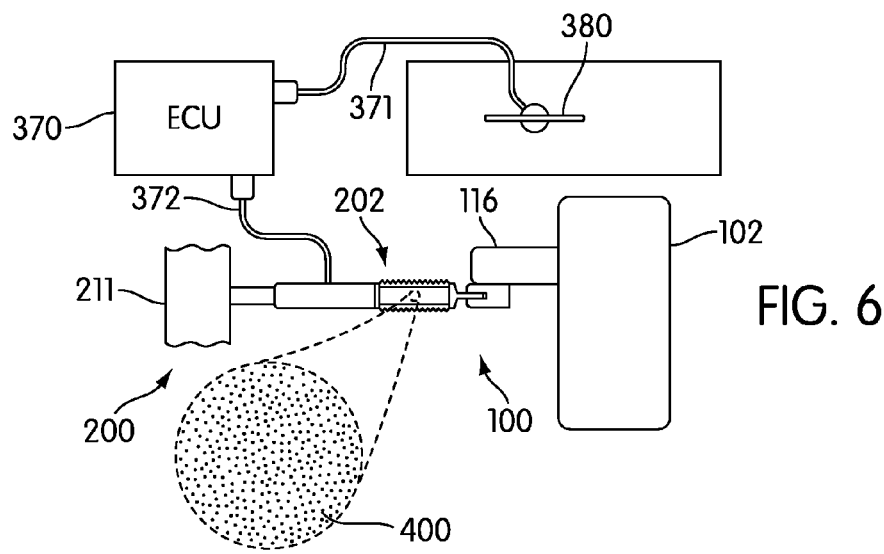
FIG. 6 is a schematic view of an exemplary embodiment of a torque steer reduction system and a throttle valve.

FIGS. 4-6 illustrate schematic views of exemplary embodiments of torque steer reduction system 200 configured to exert different damping forces on steering system 100. Preferably, the different damping forces applied by damper 202 are associated with different positions of throttle valve 380. In FIGS. 4-6, damping coefficients of damper 202, and thus the damping force exerted by damper 202, may be associated with enlarged schematic illustrations of viscosities of fluid within damper 202. For the purposes of illustration, viscosities of the fluid within damper 202 are represented by densities.

It should be understood that the throttle positions and associated viscosities illustrated in these Figures are intended to be exemplary. In other embodiments, torque steer reduction system 200 may associate particular throttle positions with different damping coefficients and viscosities. Also, in other embodiments, torque steer reduction system 200 may alter damping coefficients based on information received from other components of a motor vehicle. In particular, information from other sensors may be integrated into torque steer reduction system 200 and influence damping coefficients of damper 202. Generally, any type of information related to one or more operating conditions of a motor vehicle could be received by torque steer reduction system 200 to determine damping coefficients. For example, information from the speedometer regarding vehicle speed may be used to influence the control of damper 202. In another example, acceleration information could be input to torque steer reduction system 200 to determine damping coefficients of damper 202.

Referring to FIG. 4, torque steer reduction system 200 receives information from ECU 370 that throttle valve 380 is in a closed position. Generally, the effect of torque steer may be minimal when throttle valve 380 is in a closed position. Therefore, torque steer reduction system 200 is configured with a low damping coefficient. With this configuration, fluid 400 of damper 202 has a low viscosity. This provides a low damping effect on steering system 100.

FIG. 5 is an exemplary embodiment of throttle valve 380 in a partially open position. Preferably, torque steer reduction system 200 receives information from ECU 370 that throttle valve 380 is partially open. Typically, the influence of torque steer may be moderate with a partially open throttle position. With this information, torque steer reduction system 200 is configured with a medium damping coefficient. In particular, fluid 400 of damper 202 has a medium viscosity. In other words, the viscosity of fluid 400 has increased. This allows a medium damping effect on steering system 100 to counteract a moderate influence of torque steer.

Referring to FIG. 6, torque steer reduction system 200 receives information from ECU 370 that throttle valve 380 is in a fully open position. The effect of torque steer on steering system 100 may be greatest when throttle valve 380 is in a fully open position. In order to counteract torque steer, torque steer reduction system 200 assumes a high damping coefficient. With this arrangement, fluid 400 of damper 202 has a high viscosity to provide a strong damping effect on steering system 100. Preferably, this configuration allows torque steer reduction system 200 to counteract the effect of torque steer.

With this arrangement, a torque steer reduction system may reduce the effect of torque steer on a steering system without reducing torque output of an engine. By associating a damping coefficient with a factor that may correspond to the magnitude of torque steer such as throttle position; the torque steer reduction system may adjust the damping coefficient to counteract the effect of torque steer. In particular, the torque steer reduction system may effectively counter torque steer through the association of a high damping coefficient with greater throttle positions.

In some embodiments, a damper of a torque steer reduction system may be controlled by supplying an electrical current to the damper. In some cases, an electronic control unit may supply the electrical current to the damper. In other cases, another source may supply the electrical current to the damper. With this arrangement, an electrical current supplied to the damper may be configured to control a damper coefficient of the damper.

Figure 7:
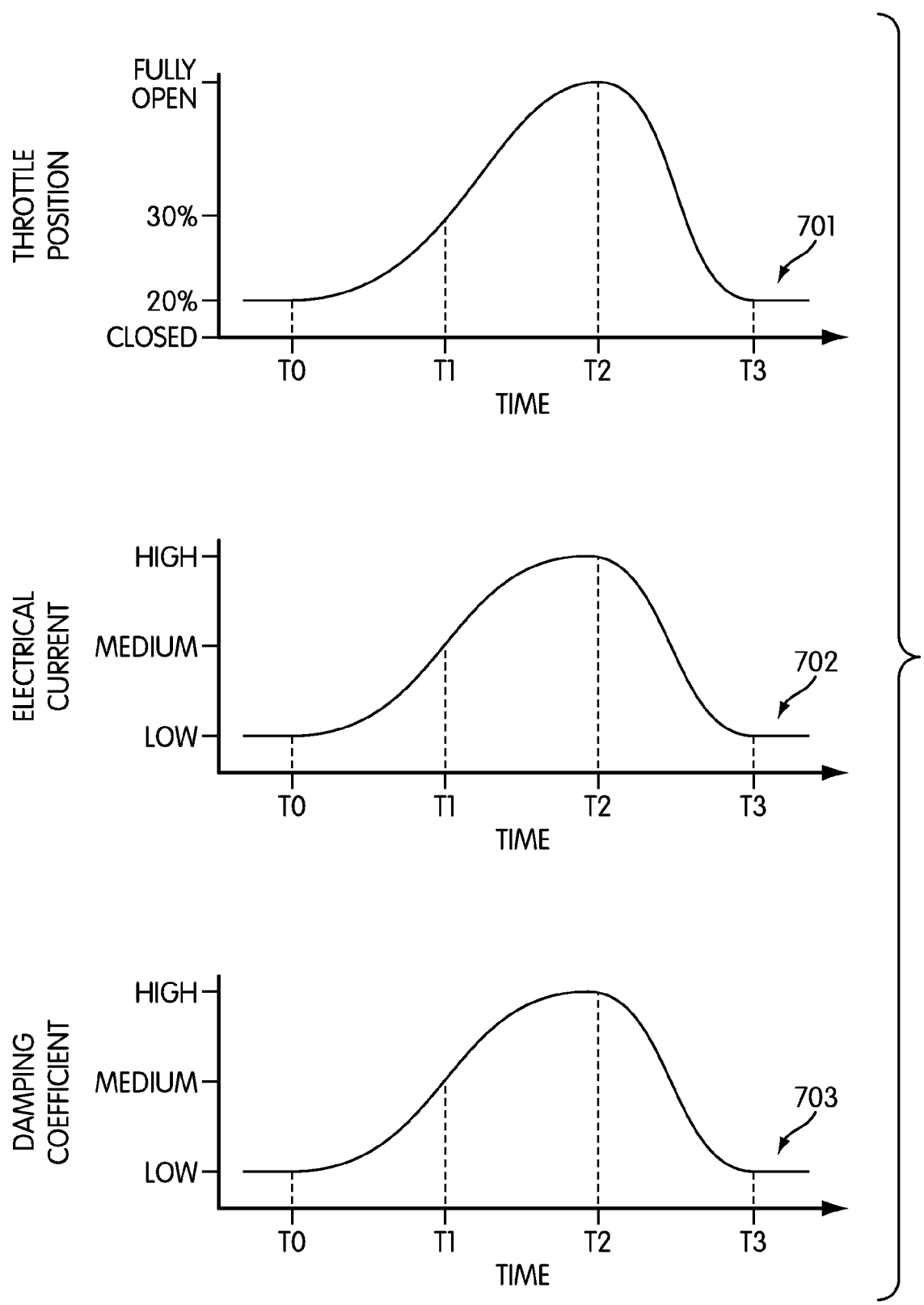
FIG. 7 is an exemplary embodiment of a relationship between throttle position, electrical current and damping coefficients.

FIG. 7 illustrates an exemplary embodiment of a relationship between throttle position, electrical current and damping coefficients as functions of time. In particular, the electrical current in this exemplary embodiment is supplied from ECU 370 to damper 202 to control the damping coefficient. Also, it should be understood that the current embodiment is only intended to be exemplary. In other embodiments, the relationship between throttle position, electrical current and damping coefficients could be varied.

In this embodiment, at time T0, throttle position curve 701 indicates throttle valve 380 is opened to about 20% of the fully open position. With this configuration, electrical current supplied to damper 202 is low as shown by electrical current curve 702. As a consequence, damping coefficient curve 703 is low at time T0. This provides a low damping effect when the throttle position is slightly opened, since torque steer is generally minimal at low throttle openings.

At time T1, throttle position curve 701 increases to approximately 30% of the fully open position. Accordingly, electrical current curve 702 increases at time T1 in order to boost the damping coefficient. In this manner, damping coefficient curve 703 increases to a medium damping coefficient at time T1.

When throttle position curve 701 reaches a fully open throttle position at time T2, electrical current curve 702 also increases to supply a high electrical current to damper 202. The rise in electrical current curve 702 provides a corresponding rise in damping coefficient curve 703. Specifically, damping coefficient curve 703 increases to a high damping coefficient at time T2 in order to apply a strong damping effect on steering system 100. With this preferred configuration, damper 202 may supply a strong damping effect when steering system 100 may be under the greatest influence of torque steer.

At time T3, throttle position curve 701 indicates a throttle position of approximately 20% of the fully open position. As a consequence, electrical current curve 702 decreases to indicate a low electrical current supplied to damper 202 at time T3. By supplying a low level of electrical current to damper 202, damping coefficient curve 703 decreases to indicate a low damping coefficient. This allows damper 202 to exert a low damping effect on steering system 100 when the influence of torque steer may be minimal.

Preferably, this arrangement provides a method of adjusting electrical current to adjust to changes in throttle position in order to control a damping force exerted by a damper.

Generally, an increase in throttle position causes an increase in electrical current that provides an increase in a damping coefficient. Similarly, a decrease in throttle position causes a decrease in electrical current that provides a decrease in a damping coefficient. Using this configuration, the damper effort applied to a steering system may be controlled by an electrical current configured to change with throttle position.

In some embodiments, the system described here for reducing torque steer could also be used for other purposes as well. For example, in some embodiments, an electronically controlled damper mounted to a steering system could be used to provide a system for adjusting the steering effort required by a driver to turn the wheels of a motor vehicle. In particular, by adjusting the damping coefficients of the damper, the force required by the user to turn the motor vehicle could be modified.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A motor vehicle, comprising:
   a steering system configured to turn at least one wheel of the motor vehicle;
   a damper including a first end portion attached to a frame portion of the motor vehicle and a second end portion attached to the steering system;
   wherein the damper is configured to exert a damping force on the steering system; and
   wherein the damping force of the damper is controlled according to a current throttle position of a throttle valve.

2. The motor vehicle according to claim 1, wherein the damper is attached to a tie rod of the steering system.

3. The motor vehicle according to claim 1, wherein the damper is attached to a steering arm of the steering system.

4. The motor vehicle according to claim 1, wherein the damper is disposed away from a control arm of the motor vehicle.

5. The motor vehicle according to claim 1, wherein the damper is oriented in a direction that is generally parallel with a bottom surface of the motor vehicle.

6. The motor vehicle according to claim 1, wherein the damping force of the damper is variable.

7. The motor vehicle according to claim 6, wherein the damping force of the damper is varied by modifying a viscosity of the damper.

8. A motor vehicle, comprising:
   a steering system configured to turn at least one wheel of the motor vehicle;
   a damper capable of exerting varying damping forces on the steering system;
   the damper including a first end portion attached to a frame portion of the motor vehicle and a second end portion attached to the steering system of the motor vehicle;
   a throttle valve sensor configured to receive information related to a current throttle position; and
   wherein the damper exerts a damping force on the steering system and wherein the strength of the damping force is controlled according to the current throttle position.

9. The motor vehicle according to claim 8, wherein the damper is a variable viscosity damper.

10. The motor vehicle according to claim 9, wherein the viscosity of the damper is controlled using an electrical current.

11. The motor vehicle according to claim 10, wherein the electrical current is increased with increased throttle position.

12. The motor vehicle according to claim 11, wherein a damping coefficient of the damper is increased with increased throttle position.

13. The motor vehicle according to claim 8, wherein the damper is connected to a drive-by-wire system of the motor vehicle.

14. A method of reducing torque steer in a motor vehicle, comprising the steps of:
   receiving information related to a current throttle position;
   determining a damping coefficient for a damper according to the current throttle position;
   controlling the damper to achieve the damping coefficient; and
   thereby reducing torque steer in the motor vehicle;
   wherein a first end portion of the damper is attached to a frame portion of the motor vehicle; and
   wherein a second end portion of the damper is attached to a steering system of the motor vehicle.

15. The method according to claim 14, wherein the first end portion of the damper is attached to the frame portion using a frame mount.

16. The method according to claim 14, wherein the damper is oriented in a generally horizontal direction.

17. The method according to claim 14, wherein the second end portion of the damper is attached to a tie rod of the steering system.

18. The method according to claim 17, wherein the second end portion of the damper is attached to a steering arm of the steering system.

19. The method according to claim 14, wherein the step of controlling the damper includes a step of sending a current to the damper.

20. The method according to claim 19, wherein the magnitude of the current is related to the current throttle value.

* * * * *